United States Patent [19]

Isayev

[11] Patent Number: 5,238,638
[45] Date of Patent: *Aug. 24, 1993

[54] PROCESS FOR PREPARING A SELF-REINFORCED THERMOPLASTIC COMPOSITE LAMINATE

[75] Inventor: Avraam Isayev, Akron, Ohio

[73] Assignee: The University of Akron, Akron, Ohio

[*] Notice: The portion of the term of this patent subsequent to Dec. 3, 2008 has been disclaimed.

[21] Appl. No.: 853,140

[22] Filed: Apr. 20, 1992

Related U.S. Application Data

[60] Division of Ser. No. 801,429, Dec. 2, 1991, which is a continuation-in-part of Ser. No. 568,601, Aug. 16, 1990, Pat. No. 5,070,157.

[51] Int. Cl.$^5$ .................. C08L 67/03; C08L 69/00
[52] U.S. Cl. ........................ 264/257; 264/258; 264/259; 264/212; 264/241; 264/247; 264/330; 264/331.12; 264/109; 264/119; 428/1; 428/113; 428/114
[58] Field of Search ............ 524/539; 428/1, 113, 428/114; 525/127, 425, 434; 264/108, 177.13, 331.21, 258, 259, 212, 241, 247, 330, 331.12, 109, 119

[56] References Cited

U.S. PATENT DOCUMENTS

| | | | |
|---|---|---|---|
| 4,267,289 | 5/1981 | Froix | 524/535 |
| 4,650,836 | 3/1987 | George et al. | 428/113 |
| 4,728,698 | 3/1988 | Isayev et al. | 525/439 |
| 4,820,568 | 4/1989 | Harpell et al. | 525/444 |
| 4,837,268 | 6/1989 | Matsumoto | 525/444 |
| 4,902,369 | 2/1990 | Avramova et al. | 525/444 |
| 5,070,157 | 12/1991 | Isayev et al. | 524/539 |

FOREIGN PATENT DOCUMENTS

WO9101879  2/1991  PCT Int'l Appl. .

OTHER PUBLICATIONS de Meuse, M. R. & Jaffe, M. *Polymer Preprints* vol. 30, No. II, Sep. 19, 1989, pp. 540-541.

*Primary Examiner*—Patrick J. Ryan
*Assistant Examiner*—Richard C. Weisberger
*Attorney, Agent, or Firm*—Oldham, Oldham & Wilson Co.

[57] ABSTRACT

Composite laminates are prepared from thin sheets of thermotropic liquid crystal polymer blends. A preferred blend contains 2 thermotropic liquid crystal polymers, i.e., a first liquid crystal polymer in LCP-1, and a second liquid crystal polymer (LCP-2), the second liquid crystal polymer having a higher melting point than the first. The second liquid crystal polymer is molecularly oriented and is preferably at least partially in the form of microscopic fibers in a matrix of the first liquid crystal polymer. The two liquid crystal polymers are phase separated in the solid phase and have overlapping melt processing temperatures.

6 Claims, 2 Drawing Sheets

PROCESS FOR PREPARING A SELF-REINFORCED THERMOPLASTIC COMPOSITE LAMINATE

CROSS-REFERENCE TO RELATED APPLICATION

This is a divisional of copending application Ser. No. 07/801,429, filed on Dec. 2, 1991, which is a continuation-in-part of co-pending application Ser. No. 07/568,601, filed Aug. 16, 1990, now U.S. Pat. No. 5,070,157.

TECHNICAL FIELD

This invention relates to composite laminates of liquid crystal polymer blends. More particularly, this invention relates to a composite laminates formed from blends of two thermotropic liquid crystal polymers which have overlapping processing temperature ranges but different minimum processing temperatures, and which are incompatible or immiscible in the solid phase.

BACKGROUND ART

Fiber reinforced thermoplastics are well known. Reinforcing fibers may be short (e.g. chopped fiberglass) or long continuous fibers. Cogswell, "The Processing Science of Thermoplastic Structural Composites", *Intern. Polymer Processing*,1 (1987) 4, pp. 157-165 illustrates the latter. Specifically, Cogswell describes polyether etherketone (PEEK) reinforced with carbon fibers. Cogswell further teaches that the composite may be in the form of a laminate of two or more layers or plies, and that the carbon fibers in adjacent layers may be oriented in different directions. Carbon fibers are formed separately and are thereafter incorporated into the thermoplastic matrix by conventional means.

U.S. Pat. No. 4,820,568 to Harpell et al discloses a multilayer composite comprising a plurality of prepreg layers, in which layer comprises high strength preformed fibers of conventional materials (e.g., carbon, graphite, cellulose or metal) in a polymer matrix. The fibers are oriented in the same direction.

U.S. Pat. Nos. 4,728,698 and 4,835,047, both to Isayev, et al., disclose liquid crystal fiber reinforced polymer composites in which the liquid crystal fibers are formed in situ in a matrix of flexible chain thermoplastic polymer. The essentially unidirectionally oriented fibers are formed by application of high strain rate mixing conditions.

M. P. De Meuse and M. Jaffe *Polymer Preprints*, vol. 30, no. II, Sep. 19, 1989 pp 540-541 discloses LCP/LCP blends which are miscible in both the melt and solid states.

Application 07/695,507 describes and claims blends of two thermotropic liquid crystal polymers, one having a melting point and the other having a glass transition temperature, which are both melt processable with overlapping processing temperature ranges, one of which has a higher minimum processing temperature than the other and which are phase separated in the solid phase. The second liquid crystal polymer forms fibers in situ in a matrix of the first polymer under appropriate mixing conditions over at least a part of the composition range.

U.S. Pat. No. 4,902,369 to Avramova et al discloses a process for laminating a liquid crystal polymer film having a high degree of molecular orientation while maintaining such orientation, and to the resulting multilayer laminate. The liquid crystal polymer film is prepared from a single liquid crystal copolymer, i.e., a copolymer of poly(ethyleneterephthalate) (PET) with p-hydroxybenzoic acid.

DISCLOSURE OF THE INVENTION

This invention according to one aspect provides a composite laminate formed from a plurality of sheets or layers of a liquid crystal polymer blend. The blend is a blend of two thermotropic liquid crystal polymers having overlapping melt processing temperature ranges and which are phase separated in the solid state. The second liquid crystal polymer has a higher minimum processing temperature than the first and is believed to form reinforcing fibers in situ in a matrix of the first liquid crystal polymer under appropriate mixing conditions.

This invention according to another aspect provides a process for preparing a composite laminate from a liquid crystal polymer blend as described above. Lamination is preferably carried out at a temperature at which the first liquid crystal polymer is melt processable (i.e., a temperature equal to or above the melting point of the first liquid crystal polymer) but below the melting point of the second liquid crystal polymer. In this way the molecular orientation of the second liquid crystal polymer in the laminate is preserved.

The laminate may be formed so that the direction of molecular orientation is either than same in all layers or different in successive layers. In the former case, the resulting composite laminate will be anisotropic, i.e., mechanical properties and the direction of orientation will be different from the corresponding properties in other directions. On the other hand, an essentially isotropic composite laminate can be obtained by forming the laminate such that the direction of molecular orientation is different in different layers.

It is believed that the second or higher melting liquid crystal polymer forms reinforcing fibers in situ in a matrix of the first or lower melting liquid crystal polymer, but in any case the second liquid crystal polymer is molecularly oriented.

BRIEF DESCRIPTION OF THE DRAWINGS

This invention will be described in further detail with particular reference to the accompanying drawings, in which:

FIGS. 5, 5A, 5B and 5C are schematic diagrams showing various prepregged lay-ups for producing a composite laminate. These differ in the different patterns of fiber orientation with respect to the respective sheet edges and with respect to adjacent sheets or layers.

BEST MODE FOR CARRYING OUT THE INVENTION

This invention will be described with particular reference to the best mode and preferred embodiment of this invention, in which a composite laminate is formed from the blend of two thermotropic liquid crystal polymers having different melting points as above described. It is believed that the second o higher melting liquid crystal polymer forms reinforcing fibers in situ in a matrix of the first or lower melting liquid crystal polymer, but in any case molecular orientation in the second liquid crystal polymer is preserved by virtue of the fact that processing is carried out a temperature below the melting point of the second liquid crystal polymer.

Figure 1:
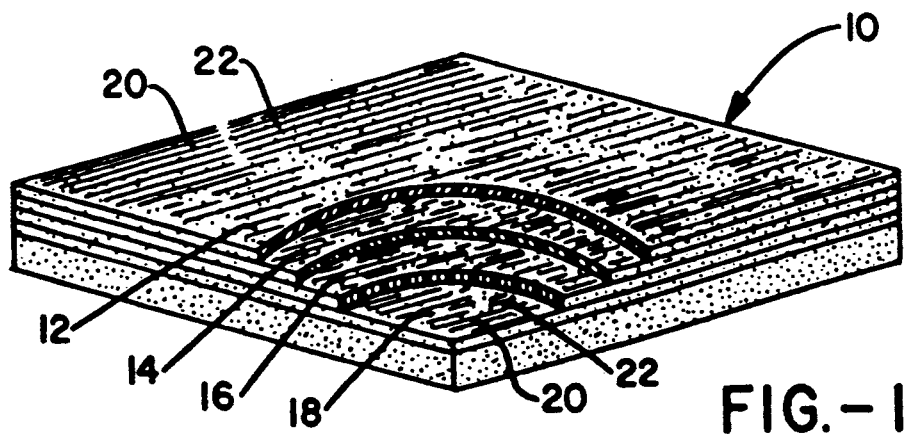
FIG. 1 is a schematic isometric view of a composite laminate according to one embodiment of the invention, in which the direction of molecular orientation in all layers is the same.

Referring now to FIG. 1, 10 is a composite laminate according to one embodiment of this invention. Laminate 10 comprises a plurality of layers, including layers 12, 14, 16 and 18. Additional layers (not shown in detail in FIG. 1) may be present. Each layer comprises a plurality of essentially unidirectionally oriented fibers of a second or higher melting liquid crystal polymer (LCP-2), in a matrix 22 of a first or lower melting liquid crystal polymer (LCP-1). These fibers 20 are formed in situ in the matrix under fiber-forming conditions to be hereinafter described. The fibers 20 in all of the layers in the embodiment of FIG. 1 are oriented in the same direction, i.e., the lengthwise direction (parallel to the lengthwise edge of the laminate). Even if fibers of LCP-2 do not form under certain conditions, LCP-2 in the laminate is molecularly oriented and the lines 20 indicate the direction of molecular orientations. The laminate shown herein is square, so that one edge is arbitrarily taken as the lengthwise edge. Of course, it will be understood that the laminate may be of rectangular or other desired shape.

Each layer in laminate 10 is obtained from an individual prepreg sheet by shaping techniques to be described hereinafter. Thickness of laminate 10 is less than the total thickness of the prepreg sheets prior to shaping. Total thickness of the pre-preg sheets prior to shaping, divided by the thickness of the shaped laminate 10, is the reduction ratio. The reduction ratio is always greater than 1; the larger the reduction ratio, the greater the degree of compression during shaping. Laminate 10 of any desired thickness can be obtained simply by choice of the number of prepreg sheets used to prepare the laminate.

Normally all layers of laminate 10 have the same composition. The boundary lines between adjacent layers shown in FIG. 1 in that case are actually indiscernible in a laminate of this invention. These lines are shown for convenience and explanation of the invention.

Figure 1A:
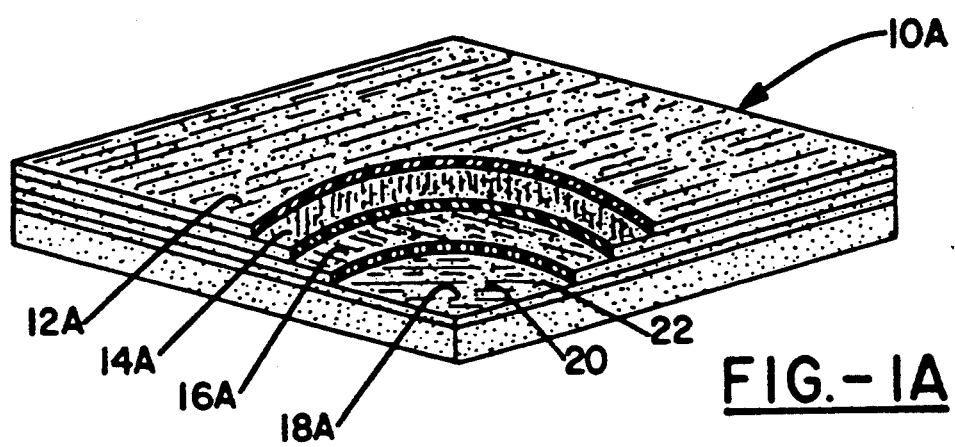
FIG. 1A is a schematic isometric representation of a composite laminate according to a second embodiment of the invention, in which the molecules of the second liquid crystal polymer are oriented in different directions in different layers so as to give an essentially isotropic composite laminate.
Figure 2:
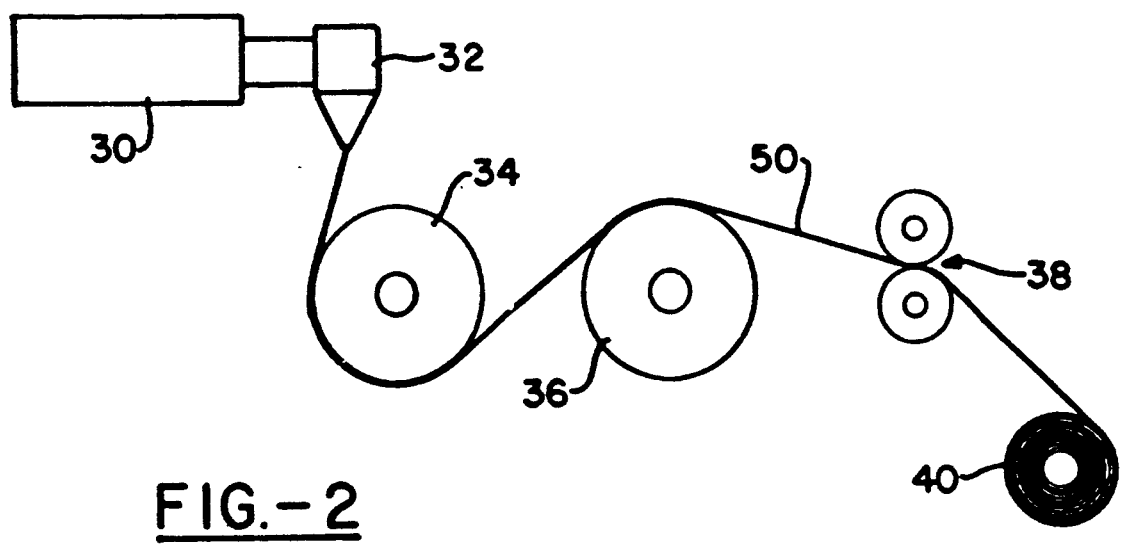
FIG. 2 is a schematic view of the process and apparatus for forming a prepreg in the form of an individual layer or sheet according to this invention.

FIG. 1A shows a composite laminate 10A having a plurality of layers 12A, 14A, 16A and 18A, plus additional layers not shown in detail as desired. Each layer comprises a plurality of essentially unidirectionally oriented LCP fibers 20 in a matrix 22 of LCP-1 polymer. However, fibers 20 in different layers of this composite laminate are oriented in different directions, e.g., at 0°, 45°, 90° and 135° (i.e., −45°) with respect to the lengthwise edge of the laminate 10A (other suitable fiber orientation patterns will be discussed subsequently). Where more than 4 layers are present in laminate 10A, the fiber orientation pattern shown in the first 4 layers of 12A, 14A, 16A and 18A may repeat throughout the laminate. A fiber orientation pattern such as that shown in FIG. 1A gives an essentially isotropic laminate, i.e., one whose mechanical properties are essentially the same in both the lengthwise and width wise directions. But in contrast, the laminate 10 of FIG. 1 is anisotropic, displaying different mechanical properties, such as greater ultimate strength and higher modulus in the direction o fiber orientation than in the direction transverse thereto.

Another fiber orientation pattern which gives an essentially isotropic laminate is shown in FIG. 5B. In this laminate, all fibers are oriented diagonally with respect to the longitudinal edge of the laminate, fibers in one set of alternate sheets being oriented at an angle of +45° with respect to the longitudinal edge, and the fibers in the other set of alternate sheets being oriented at an angle of −45° with respect to the longitudinal edge, so that fibers in every sheet are oriented at a 90° angle with respect to the direction of fiber orientation in the layer on either side thereof.

The required starting materials for preparing the novel composite laminates of this invention are 2 thermotropic or melt processable liquid crystal polymers which have overlapping melt processing temperature ranges and which are phase separated (i.e., immiscible or incompatible) in the solid phase. Other necessary conditions are as follows: (1) the minimum melt processing temperatures must be different, and (2) the LCP having the higher minimum melt processing temperature (i.e., LCP-2) must be capable of forming fibers in situ in a matrix of the other LCP (i.e., LCP-1).

The liquid crystal polymers are polymers which exhibit anisotropy (i.e., "crystallinity") in the liquid phase. The liquid crystal polymers used in this invention are thermotropic, i.e., they have a melting point or glass transition temperature o both and are melt processable. In general both liquid crystal polymers used in making blends herein have melting points, which is noted earlier must differ from each other.

Representative thermotropic liquid crystal polymer starting materials are wholly aromatic co-polyesters such as those described in U.S. Pat. Nos. 3,991,014; 4,067,852; 4,083,829; 4,130,545; 4,161,470; 4,318,842; and 4,468,364.

The liquid crystal polymers must have an overlapping processing temperature range. That is, the maximum processing temperature of the first liquid crystal polymer (LCP-1) is above the minimum processing temperature of the second LCP (LCP-2). The minimum processing temperature of LCP-2 should be higher than the minimum processing temperature of LCP-1 (which is the base or matrix polymer).

The LCP's must be incompatible with each other polymer. That is, the two polymers form separate phases in the solid state.

Both liquid crystal polymers LCP-1 and LCP-2 are preferably wholly aromatic co-polyesters.

A suitable first wholly aromatic co-polyester thermotropic liquid crystal polymer is a co-polyester having a melting point of about 275° C. and supplied by Celanese Research Company, Summit, N.J., under the designation "Vectra A 950". This material will be referred to herein as "LCP-1". This polymer is believed to consist essentially of about 25-27 percent of 6-oxy-2-naphthyl moieties and about 73-75 percent of p-oxybenzoyl moieties, as described in example 4 of U.S. Pat. No. 4,468,364 and in G. W. Calundann, et al. "Anisotropic Polymers, Their Synthesis and Properties", reprinted from Proceedings of the Robert A. Welch Conferences on Chemical Research, XXVI Synthetic Polymers, November 15-17, 1982, Houston, Tex., pp. 247-291 (see especially pp. 263-265). Another wholly aromatic co-polyester LCP consists of p-oxybenzoyl moieties and oxybiphenylene terephthaloyl moieties, and is available commercially under the tradename "Xydar" from Amoco Company, Chicago, Ill.

A suitable second wholly aromatic co-polyester is a thermotropic rigid rod material sold by Badische Anilin und Sodafabrik (BASF) of Ludwigshafen, Germany under the trademark "ULTRAX" KR-4003. This material is believed to be a wholly aromatic co-polyester comprising p-oxybenzoyl, terephthaloyl and hydroquinone moieties, although the composition is not known. This material has a melting point of 315° C. according to manufacturer's data.

The amount of liquid crystal polymer in a composite laminate 10 or 10A of this invention may range from about 2 to about 98 percent by weight of LCP-2, preferably about 5 to about 95 percent of LCP-2, especially about 20 to about 80% of balance essentially LCP-1.

It is possible to prepare blends of more than two liquid crystal polymers in accordance with this invention. (When more than two LCP's are present, the additional LCP's may be either compatible or incompatible with either LCP-1 or LCP-2 in the solid phase, and should have melt processing temperature ranges which overlap those of LCP-1 and LCP-2. Also, such additional liquid crystal polymer should be thermotropic. Preferred liquid crystal polymer blends are binary blends consisting essentially of LCP-1 and LCP-2.

It is possible to use as a constituent liquid crystal polymer, in either a binary blend or in a blend of more than two liquid crystal polymers, a liquid crystal polymer having a glass transition temperature (Tg) but no melting point. Such liquid crystal polymers are known and are essentially amorphous in the solid phase while exhibiting anisotropy in the liquid phase. ("Ultrax" KR-4002, made and sold by BASF is an example of such material).

Additional materials are not required but may be present. Thus, it is within the scope of the invention to prepare a mixed composite polymer by inclusion of an additional reinforcing fiber, such as glass, carbon or aramid, in addition to the fibers formed in situ from the liquid crystal polymer (LCP-2). The additional reinforcement provided by the additional fiber is not necessary in most cases, but where a very high stiffness (or very high strength) reinforced polymer composite is desired, such can be attained according to the present invention without the high loadings of conventional reinforcing fiber required in presently known polymer/fiber composites.

Other additives, such as pigments and fillers, coupling agents, flame retardants, lubricants, mold release agents, plasticizers and ultraviolet stabilizers, may be mixed with the base polymer and liquid crystal polymer as desired. The use of such additives is well known in the polymer processing art.

The preferred process for making composites of this invention will now be described with particular reference to FIGS. 2 through 5 of the drawings.

The liquid crystal polymers are mixed at a temperature at which both are processable by suitable means which will assure thorough mixing of the two polymers. Any additional ingredients which are desired in the final product are also mixed in at this time. The mixing apparatus 30 may comprise, for example, an extruder followed by a static mixer. This extruder may be either a single screw extruder or a twin screw extruder. A particularly suitable extruder for the practice of this invention is a Killion one inch single screw extruder, sold by Killion Extruders, Inc. of Riviera Beach, Fla. Other suitable extruders (disclosed in U.S. Pat. Nos. 4,728,698 and 4,835,047) include a ZSK 30 twin screw extruder, sold by Werner & Pfleiderer Corp. of Ramsey, N.J. When a single screw extruder is used, the extruder is followed by a static mixer such as a 6-element Koch Model No. KMB-150 static mixer, made and sold by Koch Industries. In any case, the extruder (and the static mixer when used) must be provided with a heating jacket, preferably one which permits zoned heating, so that the matrix LCP and the fiber forming LCP may be heated from ambient temperature to processing temperature.

The liquid crystal polymers, and any additional ingredients are fed in solid form to the mixing apparatus 30. The liquid crystal polymers are conveniently fed in the form of pellets. These pellets may be either a mixture of pure pellets of each LCP or polymer blend pellets.

The melt blend of liquid crystal polymers is passed from the mixing apparatus 30 to a sheet forming die 32, shown herein as a "coat hanger" die, where it is subjected to high deformation conditions resulting in fiber formation in situ. Further fiber formation is achieved by stretching the sheet which is extruded from the sheet forming die 32.

Figure 3:
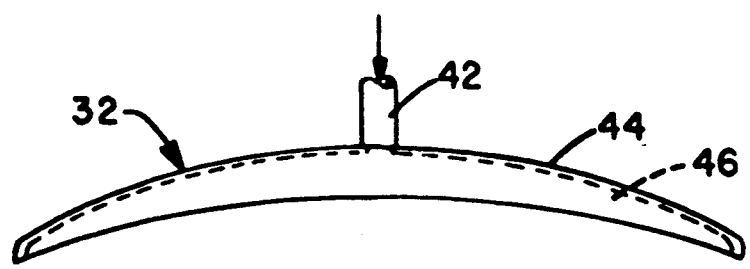
FIG. 3 is a front elevational view of a "coat hanger" sheet-forming die used in the process of this invention.
Figure 3A:
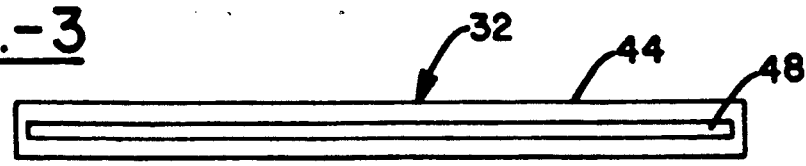
FIG. 3A is a bottom view, looking up, of the die shown in FIG. 3.

Die 32, shown in detail in FIG. 3 and 3A, comprises an inlet 42, a housing 44, which surrounds a cavity 46, and a discharge slit 48 along its lower edge. Discharge slit 48 is long and narrow and preferably adjustable. The polymer blend as it exits from die 32 is in the form of a thin sheet and its dimensions are essentially the same as the dimensions of the slit 48. This thin sheet is passed successively over a first roll 34 and a second roll 36, both of which may be either stationary rolls or rotatable idler rolls. Then the sheet passes through the nip of a pair of rolls 38, which consist of a pair of closely spaced motor driven counter rotating rolls having a pre-determined clearance therebetween. Rolls 38 are driven at a faster speed than that of the sheet emerging from die 32, so that stretching or drawing of the continuous sheet of polymer blend takes place. This stretching or drawing results in essentially uniform orientation of the fibers 20 of LCP-2 which are contained in the matrix polymer LCP-1.

The extension ratio (also known as "stretch ratio" or "draw ratio") in the process herein is the ratio of the driven speed of rolls 38 to that of the sheet emerging from die 32. While these limits may vary, it is necessary to use an extension ratio high enough to result in essentially uniform fiber direction on the one hand, while not so high as to cause the formation of holes in sheet 50 on the other. Actually, it is believed that a combination of extruder temperature and extension ratio (the former must not be too low and the latter must not be too high), rather than extension ratio alone, is responsible for hole formation in the continuous sheet 50. Conditions which cause hole formation can be determined experimentally on a composition by composition basis.

Finally, this continuous sheet 50 is wound up on a motor driven wind-up roll 40.

Figure 4:
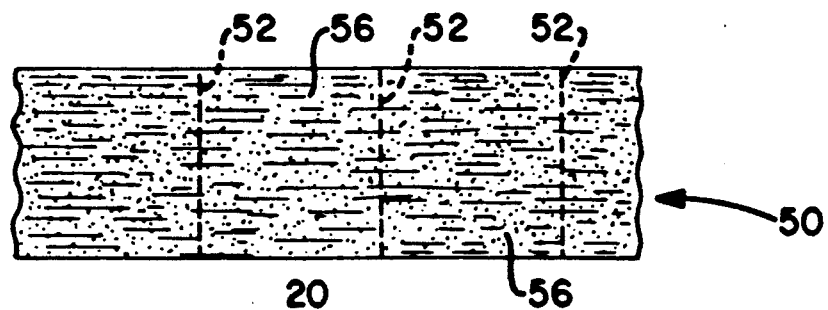
FIG. 4 is a fragmentary isometric view of a prepreg in the form of an individual sheet according to this invention, showing fiber orientation and also showing by dotted lines a pattern for transverse cutting of this sheet.
Figure 4A:
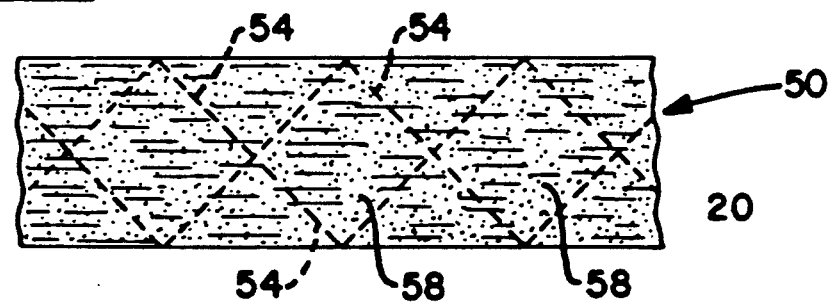
FIG. 4A is similar to FIG. 4 except that the dotted lines show a pattern for diagonal cutting of the sheet.

Prepreg sheet 50 is cut into square or rectangular pieces, either transversely along dotted lines 52 shown in FIG. 4, or diagonally (at a 45° angle to the edges) along dotted lines 54 as shown in FIG. 4A. Square pieces are shown for the purpose of illustration. Transverse cutting as shown in FIG. 4 forms pieces 56 in which the direction of fibers 20 is parallel to one edge of the piece. Cutting diagonally as shown in FIG. 4A results in pieces 58 in which the direction of orientation of fibers 20 as at 45° angle with respect to the edges or the piece.

A prepreg lay-up is formed as shown in FIGS. 5 through 5C.

A prepreg lay-up is produced by stacking a plurality of prepreg sheets 56 or 58 in a desired pattern, as shown in FIGS. 5 through 5C. According to a first pattern, shown in FIG. 5, a plurality of sheets 56, in which the fibers 20 extend parallel to two opposite edges, are laid up so that the fibers 20 in every sheet 56 are oriented in the same direction. This results in a lay-up 60, consisting of uncompressed individual sheets 56 in which all fibers 20 are oriented in essentially the same direction. This laminate 60, upon shaping, produces an anisotropic coherent composite laminate 10 as shown in FIG. 1, in which the fibers 20 throughout the laminate are oriented in essentially the same direction.

Other lay-up patterns are shown in FIGS. 5A, 5B and 5C. In FIG. 5A, sheets 56 (fibers 20 oriented parallel to opposite edges) and 58 (fibers oriented diagonally at a 45° angle) are laid up in alternating sequence, resulting in a lay-up 60A of uncompressed sheets in which there are four different fiber directions, i.e., at angles of 0°, 45°, 90° and 135° (−45°) with respect to the lengthwise extending edges of the lay-up (in the case of the square lay-up, one pair of edges is arbitrarily chosen as the lengthwise extending edges). This lay-up 60A, when molded, gives an essentially isotropic composite laminate 10A as shown in FIG. 1A. Since the fibers in this composite laminate 10A extend in different directions which are evenly spaced around the circumference of the circle, the laminate is essentially isotropic, which means that the mechanical properties in either the length direction or the width direction are essentially the same.

Other essentially isotropic composite laminates can be attained by following the lay-up patterns illustrated in FIGS. 5B and 5C. In FIG. 5B, a plurality of sheets 58 (diagonally oriented fibers) are laid up so that the direction of fiber orientation of each sheet is at a 90° angle to the direction of fiber orientation of the sheet on either side thereof. Stated another way, the fiber direction in every other sheet is +45° (with respect to the lengthwise edges) and the fiber direction in the alternate sheets is −45°. This pattern carries through lay-up 60B and in the composite laminate produced therefrom. Finally, FIG. 5C shows a lay-up pattern which utilizes the plurality of sheets 56, with the fibers extending lengthwise (0°) in every other sheet and cross-wise (90°) in the alternating sheets. This pattern carries into the lay-up 60° C. and the composite laminate produced therefrom.

The composite laminates produced from lay-ups 60B and 60C are essentially isotropic, since the reinforcing fibers 20 therein extend in two mutually perpendicular directions.

Figure 6:
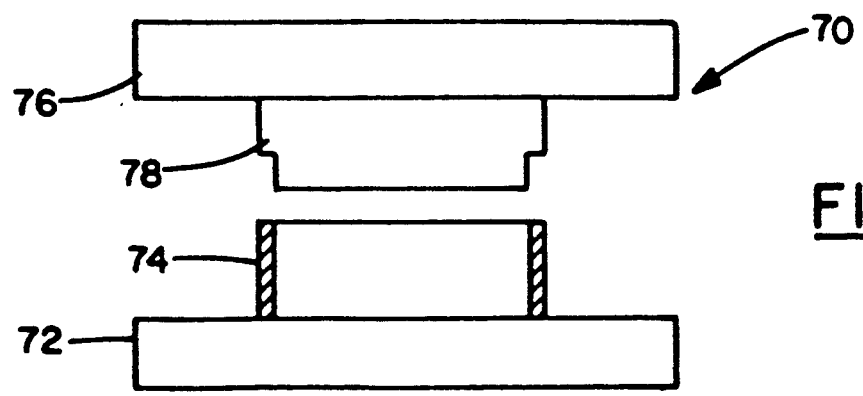
FIG. 6 is a diagrammatic view of a molding machine used in the practice of this invention.

Lay-ups 60, 60A, 60B and 60C are shaped under heat and pressure, preferably by compression molding, as shown diagrammatically in FIG. 6. The preferred apparatus for forming composite laminates 10 or 10A is a conventional compression mold 70. Such mold may comprise a stationary lower platen 72 having an upwardly extending mold cavity member 74 mounted thereon, and a vertically reciprocable upper platen member 76 having a mold cavity member 78 extending downwardly therefrom. Mold cavity members 74 and 78 are of mating shape. A lay-up 60, 60A, 60B or 60C is placed in the lower mold cavity member 74. The upper mold cavity member is lowered to molding position, and heat and pressure are applied The molding temperature is above the minimum melt processing temperature of the matrix LCP (LCP-1) but below the minimum melt processing temperature of LCP-2, so that the LCP fibers in individual layers do not disintegrate during processing. For instance, when a preferred LCP blend as specifically described herein, consisting essentially of "Vectra A950", which has a melting point of 275° C. (LCP-1) and "Ultrax" KR-4003, which has a melting point of 315° C. (LCP-2), is used, a suitable molding temperature is about 275° to about 290° C. The molding temperature (also known as the shaping temperature or consolidation temperature) can range down to the melting point of LCP-1 (275° C. in the illustrated embodiment) to just below the melting point of the higher melting polymer LCP-2 (315° C. in the illustrated embodiment). It is believed that the molding temperature should be below the minimum melt processing temperature of LCP-2, since otherwise it is believed that fiber structure of LCP-2 will disappear during molding and the reinforcing action of the fibers will be lost.

The molding pressure and time must be sufficient to cause consolidation of the lay-up into a coherent composite laminate. At the end of the molding period, the upper platen 76 is lifted and the composite laminate is allowed to cool to ambient temperature in the lower mold cavity 74. The cooled laminate is then removed and is ready for testing or use.

The nature of the fibers formed will vary somewhat from composition to composition. Usually, however, the fibers will have a diameter from about 1 to about 10 microns, although larger or smaller diameter fibers may produced in some cases. The shape may range from comparatively short rods (e.g., having a length about 5 to 10 times the diameter) to long continuous fibers. Generally, however, the fibers will be essentially unidirectionally oriented in the direction of flow during processing (th "longitudinal direction" or "machine direction"). The fibers are believed to consist essentially of the higher melting LCP (LCP-2) in a matrix of the lower melting LCP (LCP-1). All or part (usually a large part) of the LCP-1 is in the form of a matrix.

The present invention provides high performance, high strength, high modulus, high impact and high temperature resistant composites laminates. The present invention provides fiber reinforced thermoplastic composites and an economical process for preparing the same. Processing is considerably simplified by the fact that the reinforcing fibers are formed in situ rather than being formed separately in a previous operation and then encapsulated into a polymer matrix.

The blends of this invention give composites having mechanical properties, e.g., tensile strength and secant modulus, which are as good or nearly as good ( and in some cases better than ) those of either pure LCP, at substantially lower cost.

Mechanical properties of anisotropic laminates are substantially better in the machine or fiber direction than in the transverse or cross direction. On the other hand, mechanical properties of essentially isotropic laminates are similar in any direction. Tensile strength and modulus in isotropic laminates are usually somewhere between the fiber direction values and the transverse values in anisotropic laminates of the same composition.

Certain laminates of this invention, i.e., those in which the direction of fiber of molecular orientation is the same in all layers exhibit high tensile strength measured in the direction of fiber in molecular orientation) while exhibiting lower tensile strength (or ultimate strength) in the transverse direction. This shows that such laminates are anisotropic. On the other hand, by appropriate lay-up so that the direction of fiber or molecular orientation is different in different layers, one can obtain an essentially isotropic laminate.

The process of this invention saves energy. Energy requirements are less than those required to form otherwise similar laminates containing preformed reinforcing fibers.

Shaped articles can be prepared from composite laminates of this invention. The shaping temperature should be below the minimum processing temperature of LCP-2.

Composites of the present invention are particularly useful in the automotive, aircraft and marine industries. In particular, composites of this invention are useful in making automobile body parts and boat hulls. In general, composites of this invention are useful in making articles or parts where high tensile strength, high modulus and/or high impact strength are advantageous, particularly where for reasons of weight it is desirable to use reinforced plastic instead of metal. Other uses will be apparent to those skilled in the art.

This invention will now be described further with reference to the example which follows.

EXAMPLE 1

This example describes the preparation of a composite laminate 10, having the fiber configuration shown in FIG. I (i.e., all fibers extending in the same direction). This composite laminate consists of 60 percent by weight of "Vectra A-950" (LCP-1) (the matrix polymer) and 40 percent by weight of a "Ultrax" KR 4003 (LCP-2).

"Vectra A-950" (LCP-1) and "Ultrax" KR-4003 (LCP-2) have respective melting points of 275° and 315° C., as noted previously Pellets of a blend of LCP-1 and LCP-2 are charged to the inlet of a Killion single screw extruder having a one inch barrel diameter, connected to a static mixer (Koch Industries, Inc.) and to a coat hanger die. The extruder is sold by Killion Extruders, Inc. of Riviera Beach, Fla. This extruder has three heating zones 1–3 (zone 1 is near the feeder end); there are four heating zones 4–7 in the static mixer and one heating zone in the coat hanger die 32. All heating zones are operated at 300° C. The screw speed is 50 rpm. A motor current of 3 amperes is used.

The melt blend is passed continuously from the screw extruder through the static mixer and then to a coat hanger die 32. This die has a heating jacket and a discharge slit 150 mm × 1.5 mm. Sheet 50 is extruded from die 32 at a speed of 12.4 in./min. The extruded sheet passes over rolls 34 and 36 and then through the nip of a pair of rolls 38. The clearance between rolls 38 is 0.68 mm. Rolls 38 are driven at a peripheral speed of 85.2 in./min., giving an extension ratio of 6.9. (This extension ratio is the ratio of peripheral speed of roll 38 to that of the sheet emerging from die 32). Sheet 50 is wound up on wind-up roll 40.

The long continuous prepreg sheet is cut into pieces approximately 4 inches long. Sixteen (16) of these pieces are laid up in the cavity of a compression mold so that the fibers in all pieces are oriented in the same direction (i.e., as shown in FIG. 5). The upper mold die is lowered and heat and pressure (275° C., 1000 psi) are applied for one hour. The mold is then opened and the composite laminate formed therein is removed after it has cooled to approximately ambient temperature. A laminate having a thickness of 0.059 inch is obtained.

The composite laminate samples are cut into narrow test strips 0.28 inch wide × 2.5 inch long × 0.059 inch thick (the length and width representing longitudinal and transverse directions, respectively). The longitudinal and transverse directions of these test strips correspond to the fiber direction and perpendicular to the fiber direction. Tensile test at an elongation speed of 0.02 inch/min. shows a modulus of 24.4 GPa (Gigapascals) at 1% elongation in the fiber direction. Tensile strength (ultimate strength) of 303 MPa (megapascals) and elongation of break of 2.4% in the fiber direction are also observed. Tensile tests at an elongation speed of 0.02 inch/min. shows a modulus of 2.3 GPa at 1% elongation, a tensile strength of 29.5 MPa and an elongation at break of 1.3% in the transverse direction (the direction perpendicular to fiber direction).

EXAMPLE 2

The procedure of Example 1 is followed except that the lay-up pattern shown in FIG. 5A is used. In this lay-up pattern, four fiber directions are used. The respective fiber direction angles in each layer from top to bottom in the mold cavity (measured from the longitudinal edge of the example to a line parallel to the predominant fiber direction) as follows: 0 degree, 45 degree, 90 degrees and 135 degrees. The isotropic composite laminate thus obtained is tested in the same manner as the composite laminate obtained in Example 1. A modulus of 6.4 GPa, a tensile strength of 43 MPa and elongation at break of 0.68 percent were obtained.

EXAMPLE 3

This example describes preparation of anisotropic composite laminates from 50/50 and 25/75 (by weight) blend of LCP-1 and LCP-2.

The apparatus and procedure are as described in Example 1 except as otherwise noted.

The apparatus comprises a one inch single screw extruder (Killion Inc.), connected to a static mixer (Koch Industries, Inc.) and a coat hanger die, as described in Example 1.

The blending temperature in the mixing apparatus 30 (collectively the single screw extruder the static mixer) is 300° C. The screw rotation speed is 15 RPM. A sheet is extruded from the die at a speed of 3.7 in./min. Rolls are driven at a peripheral speed of 51.6 in./min.

The molding temperature is 275° C. (which is much below the melting point of LCP-2). Molding pressure is 1000 psi and molding time is 15 minutes. A laminate of 16 layers or sheets is prepared A laminate lay-up 0.047 inch thick is obtained.

Mechanical properties of the 50/50 and 25/75 LCP-1/LCP-2 laminates were measured in both the fiber direction and the transverse direction under the same test conditions as those described in Example 1. Results are shown in Table 1 below.

TABLE 1

|  | Mechanical Properties | | | |
|  | Fiber Direction | | Transverse Direction | |
| Blend (LCP-1/LCP-2) | 50/50 | 25/75 | 50/50 | 25/75 |
| Tensile strength, MPa | 184 | 236 | 19 | 20 |
| Modulus, GPa | 12.1 | 19.2 | 2.5 | 1.8 |
| Elongation at break % | 2.1 | 1.8 | 0.79 | 0.96 |

Isotropic composite laminates, having the lay-up pattern of FIG. 5A, may be prepared from the blends described in Example 3. Such isotropic laminates will have tensile strengths and moduli which are between the fiber direction values and the transverse direction values as shown in Example 3 and will be substantially the same in all directions.

While this invention has been described with respect to the best mode and preferred embodiment thereof, it is to be understood that such description is by way of illustration and not limitation.

What is claimed is:

1. A process for preparing a composite laminate wherein the required starting materials for preparing the novel composite laminate are 2 thermotropic or melt processable liquid crystal polymers (LCP) which have overlapping melt processing temperature ranges and which are phase separated (i.e., immiscible or incompatible) in the solid phase, the minimum melt processing temperatures of said polymers must be different, and the LCP having the higher minimum melt processing temperature must be capable of forming fibers insitu in a matrix of the other LCP comprising:

(a) forming a plurality of individual layers, each layer comprising a blend of thermotropic liquid crystal polymers having overlapping processing temperature ranges, said liquid crystal polymers including a first liquid crystal polymer and a second liquid crystal polymer which are phase separated in the solid state and wherein the second liquid crystal polymer has a higher minimum processing temperature than the first liquid crystal polymer and wherein said blend contains from about 2% to about 98% by weight of each of said first and second liquid crystal polymers, based on total liquid crystal polymer weight in said blend;

(b) stacking said individual layers to form a lay-up; and (c) shaping said lay-up into a coherent composite laminate under heat and pressure at a temperature which is below the minimum processing temperature of said second liquid crystal polymer.

2. A process according to claim 1 in which the direction of fiber orientation is different in different layers, whereby an essentially isotropic laminate is obtained.

3. A process according to claim 1 in which the direction of fiber orientation in all layers is essentially the same, whereby an anisotropic laminate is obtained.

4. A process according to claim 1 wherein said liquid crystal polymer comprises essentially unidirectionally oriented fibers which are formed in situ.

5. A process according to claim 1 in which each of said liquid crystal polymers has a melting point, the melting point of the second liquid crystal polymer being higher than that of the first liquid crystal polymer.

6. A process according to claim 1 wherein said blend consists essentially of said first liquid crystal polymer and said second liquid crystal polymer, each of said liquid crystal polymers having a melting point and the melting point of the second liquid crystal polymer being higher than that of the first liquid crystal polymer.

* * * * *